Oct. 20, 1936.  G. L. MOREHEAD  2,058,345
DRIVE UNIT
Filed March 24, 1927   2 Sheets-Sheet 1

Inventor:
George L. Morehead,
by his Attorneys
Howson & Howson

Oct. 20, 1936. G. L. MOREHEAD 2,058,345
DRIVE UNIT
Filed March 24, 1927 2 Sheets-Sheet 2
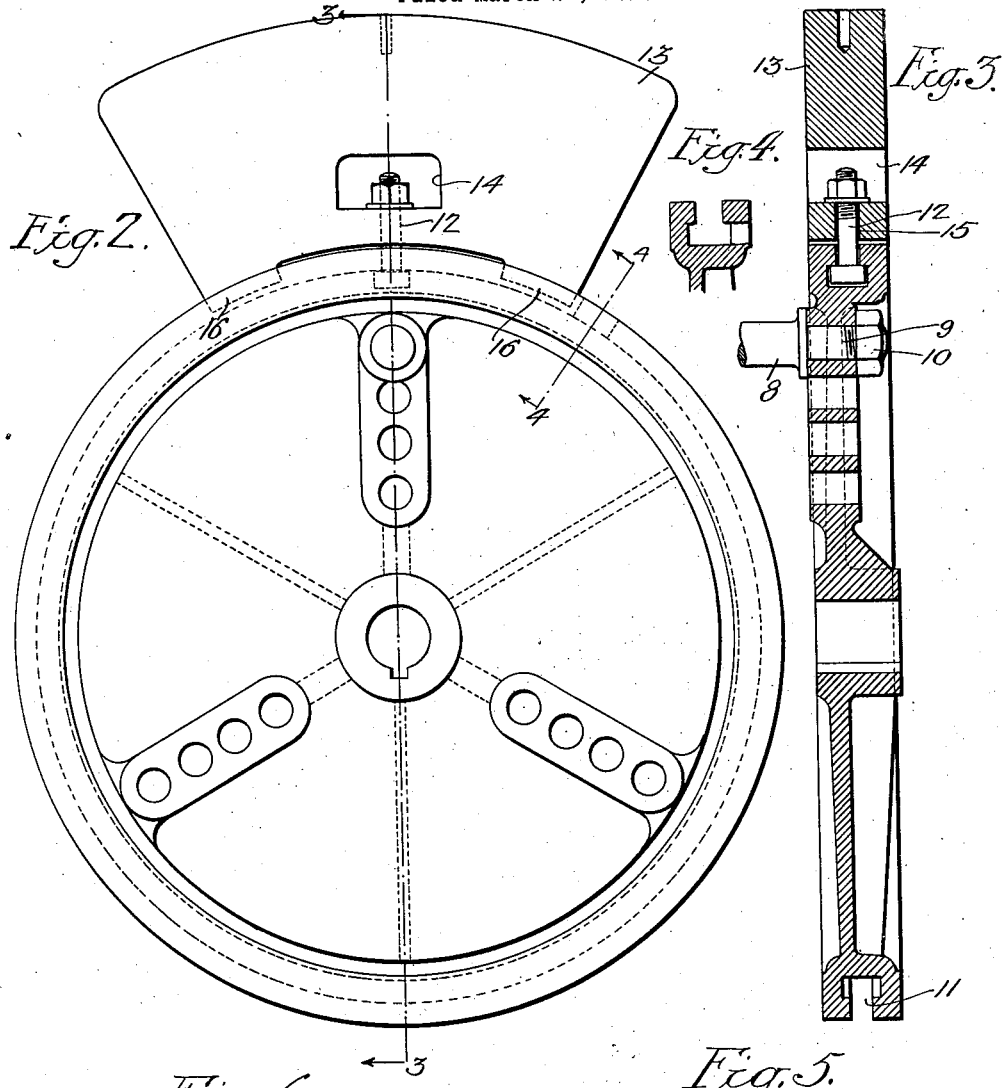
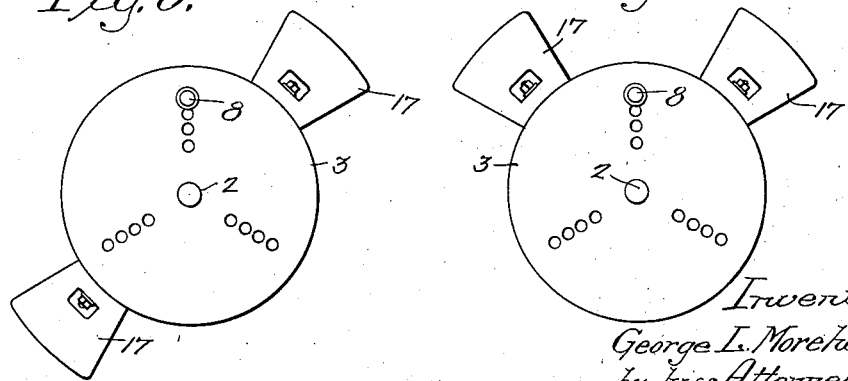
Inventor:-
George L. Morehead
by his Attorneys,
Howson & Howson Patented Oct. 20, 1936

2,058,345

UNITED STATES PATENT OFFICE 2,058,345

DRIVE UNIT

George L. Morehead, Elkins Park, Pa., assignor to Link-Belt Company, Chicago, Ill., a corporation of Illinois Application March 24, 1927, Serial No. 177,970

10 Claims. (Cl. 74—591)

My invention relates primarily to certain improvements in mechanism for driving oil well pumps, drills and like apparatus involving reciprocation of relatively heavy parts, and one object of the invention is to provide novel means for distributing the wear on the operating parts with practical uniformity, as hereinafter more specifically described.

Another object of the invention is to provide novel and improved means in the operating mechanism for counterbalancing the weight of the reciprocating driven parts.

The invention further resides in certain novel and highly advantageous structural details and features hereinafter fully set forth and illustrated in the attached drawings, in which:

Fig. 2 is a face view of the crank disk forming an element of the invention;

Fig. 3 is a section on the line 3—3, Fig. 2;

Fig. 4 is a section on the line 4—4, Fig. 2, and

Figs. 5, 6, 7 and 8, are diagrammatic views illustrating the manipulation of the counterbalance weights on the crank disk to obtain various desirable counterbalance effects.

Figure 1:
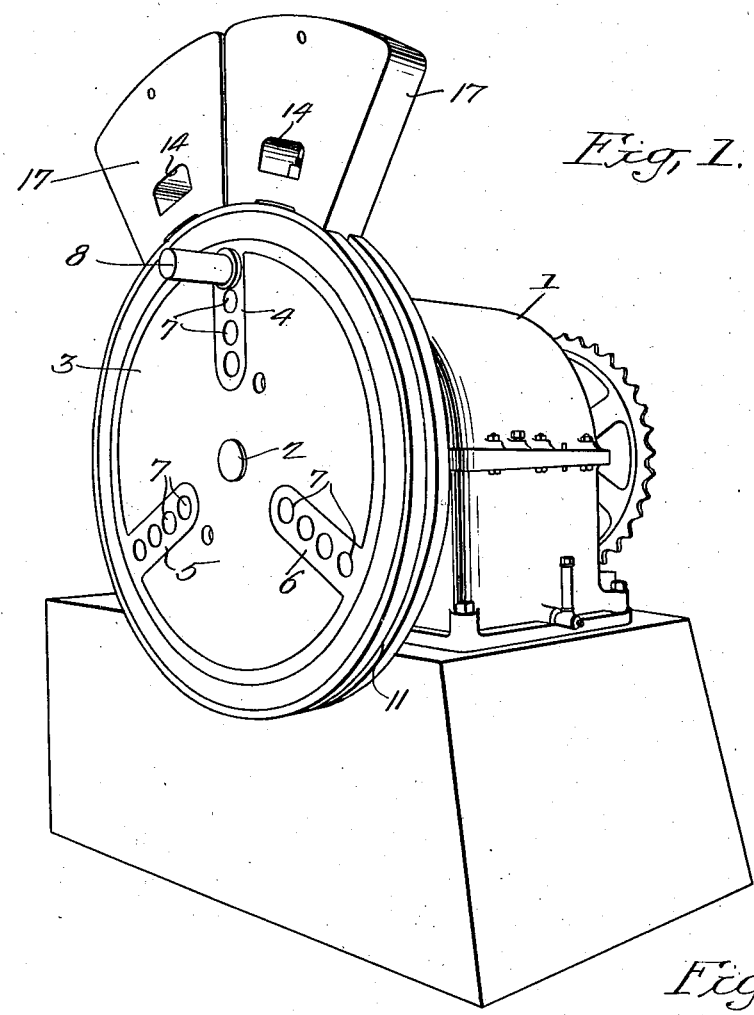
Figure 1 is a view in perspective of an oil well pump drive unit incorporating a preferred embodiment of the invention.

The driving unit illustrated in Fig. 1 may consist of a prime mover in the form of an electric motor (not shown) which is connected through suitable reduction gearing, enclosed in a casing 1, with a crank shaft 2. This shaft 2 carries on its projecting end a wheel or disk 3 having therein two or more evenly spaced radial sets of openings 4, these sets being three in number in the present instance and being designated respectively by the reference numerals 4, 5 and 6. The openings 7 of each series extend parallel to the axis of the shaft 2 and are adapted for reception of a crank pin 8 which may be secured in the said openings, as shown in Fig. 3, by means of a stud 9 constituting an integral part of the pin and a nut 10 threaded on the stud at the rear of the disk. Obviously the crank pin is adjustable to any one of the openings 7 of any of the series.

In the usual oil well gear, the crank pin is connected through a connecting rod with a walking beam through which a reciprocatory movement is imparted to the pump plunger. Where a fixed crank has been used on the slow speed or drive shaft 2, the wear on the main gear carried by the slow speed shaft has been confined to an arc of about 120° on its circumference due to the fact that the major portion of the work is done during the upward movement of the pump piston. By the present invention, I provide means whereby the crank position may be varied angularly with respect to the shaft so that the wear upon the gear may be distributed with uniformity around the entire circumference. Also the construction provides for an adjustment of the crank throw in any one of the angular positions.

It will be noted that the disk 3 is provided at its periphery with a T-slot 11 which runs entirely around the circumference. At the back of the disk, as shown in Fig. 4, the wall of the slot at one point is cut away sufficiently to afford entrance to the slot of bolts 12 by means of which counterweights 13 may be secured to the disk. These counterweights 13 which may be of any desired size are segmental in shape and are provided in a preferred form with a transverse opening 14 and a passage 15 extending from the inner concaved edge of the weight into said opening 14 for reception of the bolt 12, the opening 14 being sufficiently large to permit application of a retaining nut to the projecting end of the bolt. Preferably the weights are provided at their inner concaved edges with one or more projecting lugs or flanges 16 which project and fit neatly into the outer end of the slot 11, as illustrated. By this means, a single bolt is sufficient to retain the weight firmly in position on the disk. It will be apparent that by loosening the nut of the retaining bolt 12, the weight may be adjusted to any desired position around the circumference of the disk.

Although as shown in Fig. 2, a single counterweight 13 may be used, I have found that the use of two or more relatively small and preferably identical weights has certain material advantages. Such relatively small weights I have illustrated in Fig. 1, which shows two weights 17 mounted together and corresponding, so far as the counterweight effect is concerned, with the single weight 13 shown in Fig. 2.

With the crank pin and weights arranged as shown in Fig. 1, a maximum counterweight effect is obtained. If the weights 17 are moved to the position shown in Fig. 5 equidistant from the pin 8, the counterweight effect is reduced, since the effective distance of the weights from the center of the disk is decreased. Obviously the zero effect will be obtained when the counterweights are adjusted to diametrically opposite positions, as shown for example in Fig. 6.

It will be noted that the construction provides for adjustment of the counterweight effect without removal or addition of parts and by simple adjustment of the weights. Also this adjustment of counterweight action is had without altering the original fly wheel effect; since the actual mass of the moving parts remains the same, regardless of the position of the counterweights. In oil well practice, it is frequently desired to use the pumping mechanism as a hoisting medium, in which event it is desirable to eliminate all counterweight effect. The present device employing the multiple counterweights affords a simple method of eliminating counterweight effect without detaching any of the parts.

Figure 8:
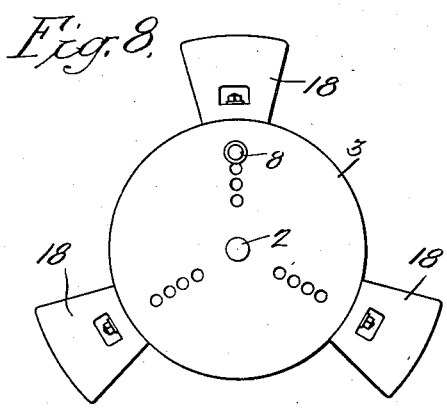
Figure 7:
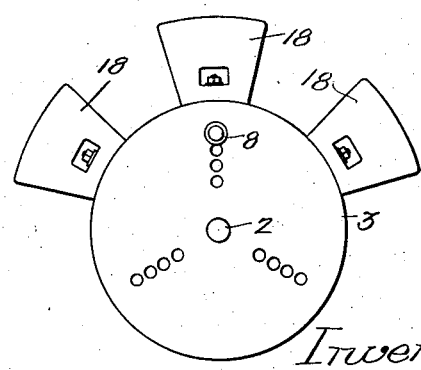

Obviously the same benefits may be obtained by utilizing more than the two weights illustrated in Figs. 1, 5 and 6. In Fig. 7 for example, I have illustrated the use of three weights 18 which may be variously adjusted to afford the desired counterweight effect. In this instance when it is desired to reduce the counterweight effect from the maximum, the central weight, at the top of Fig. 7, is left stationary and the two end weights adjusted as shown for example in Fig. 7. Where as in this instance the counterweight effect is to be entirely eliminated, this may be accomplished by adjusting the weights to the relative position shown in Fig. 8.

It will be apparent that there may be considerable modification in the aforedescribed device without departure from the invention.

I claim:

1. The combination with a rotary shaft, of a crank comprising a wheel mounted on the shaft, a crank pin in said wheel, means providing for adjustment of the pin in the wheel, and a plurality of counterweight elements carried by and adjustable circumferentially of said wheel.

2. The combination with a rotary shaft, of a crank and counterbalance assembly including means for adjusting the effective crank position angularly with respect to the shaft and an annular member concentric with the shaft, and a plurality of counterweight elements carried by and individually adjustable circumferentially on said annular member.

3. The combination with a rotary shaft, of means affording a plurality of crank pin positions angularly of said shaft a plurality of counterweight elements operatively associated with the shaft, and means for adjusting the weights so as to be uniformly effective in each of said crank pin positions.

4. The combination with a rotary shaft, of a crank and counterbalance assembly comprising a crank adjustable to a plurality of effective positions angularly of the shaft, and counterweight means also adjustable angularly of the shaft and thereby uniformly effective for any position of the crank.

5. The combination with a rotary shaft, of a crank and counterbalance assembly comprising a member attached to said shaft and having a peripheral portion concentric with the shaft, a crank pin, means for adjusting the crank pin to different positions on said member angularly with respect to the shaft, a plurality of counterweights, and means for adjustably securing said counterweights at the periphery of said member.

6. The combination with a rotary shaft, of a crank and counterbalance assembly comprising a wheel adapted to be attached to said shaft, said wheel having a plurality of series of radially disposed openings, a crank pin adapted to be detachably secured in said openings, and a plurality of counterweights engaging the periphery of said wheel and adjustable around said periphery.

7. The combination with a rotary shaft, of a crank and counterbalance assembly comprising a wheel member adapted to be secured to said shaft, said member having a plurality of series of radially arranged openings, a crank pin adapted to be detachably secured in said openings so as to project from the wheel parallel to the axis of said shaft, said wheel having in the periphery a continuous T-slot, a plurality of bolts adjustable in said slot, and counterweights adapted to engage the periphery of the wheel and to be secured to said wheel by said bolts.

8. In a device of the character described, a crank shaft, a crank arm thereon, a load reciprocating means connected therewith, a circular support on said shaft, said support having a channel therein extending about said arm and shaft, a weight adapted to fit said support and slide in said channel, and means to clamp said weight in various adjusted positions thereon.

9. In a counterbalance mechanism for well pumping apparatus, an attachment for a crank shaft including a crank arm, a weight, and means on said crank and said weight whereby said weight may be adjusted circumferentially with respect to said crank arm.

10. In a counterbalance mechanism for well pumping apparatus, an attachment for a crank shaft including a crank arm, a weight, and means whereby said weight may be adjusted circumferentially with respect to said crank arm.

GEORGE L. MOREHEAD.